United States Patent
Fujita et al.

(10) Patent No.: US 6,172,786 B1
(45) Date of Patent: Jan. 9, 2001

(54) OPTICAL DEFLECTION DEVICE AND IMAGE FORMING APPARATUS THEREWITH

(75) Inventors: Atsushi Fujita; Shinji Morita; Satoshi Shibuya; Masao Itoh; Naoji Kamimura, all of Hachioji (JP)

(73) Assignee: Konica Corporation (JP)

( * ) Notice: Under 35 U.S.C. 154(b), the term of this patent shall be extended for 0 days.

(21) Appl. No.: 09/143,894

(22) Filed: Aug. 31, 1998

(30) Foreign Application Priority Data

Sep. 3, 1997 (JP) .................................................... 238317
Sep. 4, 1997 (JP) .................................................... 239540
Sep. 4, 1997 (JP) .................................................... 239541

(51) Int. Cl.[7] .................................................... G02B 26/08
(52) U.S. Cl. ........................... 359/200; 359/198; 359/216
(58) Field of Search ..................................... 359/198, 200, 359/216, 219; 310/90, 90.5; 347/257, 261

(56) References Cited

U.S. PATENT DOCUMENTS 5,434,695 * 7/1995 Saito et al. ............................ 359/200
5,606,448 * 2/1997 Suzuki et al. ......................... 359/200

* cited by examiner

Primary Examiner—James Phan
(74) Attorney, Agent, or Firm—Jordan B. Bierman; Bierman, Muserlian and Lucas

(57) ABSTRACT

An optical deflection device includes: a rotor having reflection surfaces on a cirumferential surface thereof; a bearing for rotatably supporting the rotor; a magnet fixed on the rotor; a supporting member for supporting the bearing, on which a radiating fin is integrally formed; and a coil fixed on the supporting member at a position where the coil faces the magnet for forming a magnetic field.

12 Claims, 12 Drawing Sheets

PRIMARY SCANNING DIRECTION

SECONDARY SCANNING DIRECTION

EXHAUST HOT WIND DIRECTION

OPTICAL DEFLECTION DEVICE AND IMAGE FORMING APPARATUS THEREWITH

BACKGROUND OF THE INVENTION

The present invention relates to an optical deflection device which deflects a laser beam for scanning and to an image forming apparatus which forms images by means of a laser beam by the use of the optical deflection device.

In an image recording apparatus such as a laser beam printer, a laser beam is caused to strike upon a polygon mirror which rotates at high speed, based on information obtained by reading the image as a writing means, and reflected light is projected on the surface of a photoreceptor on a scanning basis for recording images.

FIG. 11 is a sectional view showing the structure of a scanning optical device in the prior art wherein a light beam is deflected for scanning when a polygon mirror is driven to rotate.

When a polygon mirror is rotated at a low speed, it is fixed directly on a rotary shaft of a driving motor to be used. When the polygon mirror is rotated at high speed, however, it is driven to rotate through an air bearing wherein the polygon mirror is fixed on an outer tube of a radial shaft which floats without touching an inner tube of a radial shaft to rotate. The inventors of the invention disclose technologies about an optical deflecting device having therein a dynamic pressure bearing, in TOKKAIHEI Nos. 7-24343, 7-259849, 8-114219 and 8-121471.

FIG. 11 is a diagram showing the sectional structure of optical deflecting unit 100 representing an optical deflecting device having dynamic pressure bearing 110 as a bearing means composed of upper thrust plate 111, lower thrust plate 112 and radial shaft inner tube 113. In FIG. 11, the dynamic pressure bearing 110 is composed of center shaft 114 of casing 101, radial shaft inner tube 113 structured to be solid with the center shaft 114, upper thrust plate 111 and lower thrust plate 112. Coil 115 constituting static magnetic field of a motor is fixed on casing 101 serving as a supporting member. Ring-shaped magnet (permanent magnet) 121 for rotating magnetic field, outer ring section 122 made of aluminum, radial shaft outer ceramic tube 123, rotary polygon mirror 124 and mirror holder 125 are assembled solidly and concentrically as rotor 120 wherein the rotary polygon mirror 124 is sandwiched between the outer ring section 122 and the mirror holder 125. The rotor 120 is fitted to the radial shaft inner tube 113, and the upper thrust plate 111 is fixed on the center shaft 114. When the rotor 120 is rotating, there are formed clearances S of about 3–10 μm between the group of the radial shaft inner tube 113, the lower thrust plate 112 and the upper thrust plate 111 and the group of the upper and lower surfaces and inner circumferential surface for fitting of the radial shaft outer tube 123, thus, the rotor 120 can continue rotating smoothly without touching the dynamic pressure bearing 110 while floating in the air.

Namely, in company of the rotor 120, polygon mirror 124 also rotates, and a laser beam emitted from a laser unit is deflected toward an unillustrated photoreceptor for scanning.

Casing 101 for optical deflecting unit 100 composed of the rotary polygon mirror 124, the dynamic pressure bearing 110 and the rotor 120 is formed to be one body through an aluminum die casting, and an upper opening is covered with cover 102 made of a sheet metal or a synthetic resin plate.

When an air bearing having the structure stated above is used, it is possible to rotate a polygon mirror at a rate of tens of thousands rpm, and as a result, an image forming apparatus such as a high speed digital copying machine or laser printer has been realized.

However, when a polygon mirror is rotated at high speed, heat is generated in large quantities, and thereby the temperature of an optical deflecting device and temperature around the optical deflecting device in an image forming apparatus in which the optical deflecting device is mounted are raised.

When the amount of heat generated from the optical deflecting device is large, deterioration of surface accuracy of a polygon mirror caused by thermal deformation and fluctuation of rotation of the rotor 120 are generated, and thereby uneven scanning and image distortion are caused on outputted images to deteriorate quality of images. This phenomenon is conspicuous especially when enhancing recording density by rotating the polygon mirror 124 at high speed.

When a cooling device is provided on an optical deflecting device additionally as measures for the aforesaid problems, the number of parts in the optical deflecting device is increased, resulting in another problem that assembly man-hour is increased, cost is increased and an optical deflecting device needs to be large in size.

In addition, in the optical apparatus employing a laser scanning optical system such as an image reading device, miniaturization or cost reduction of an apparatus has been pursued. FIG. 12 shows a conventional example of an optical detecting device which makes an optical beam to scan at prescribed angle for scanning in a laser optical unit.

In FIG. 12, polygon mirror J1 is fixed on polygon mirror supporting member J2 by holding member J7. The polygon mirror supporting member J2 is supported by shaft J3 and is supported by bearing J6 through electromagnetic actions of coil J5 and magnet J4 to rotate. The magnet J4 is fixed on vertical supporting arm J21 extended from the polygon mirror supporting member J2.

The optical deflecting device mentioned above has the structure to fix polygon mirror J1 and magnet J4 on the polygon mirror supporting member J2. Since a magnet is fixed on a supporting member which is bent at right angles, therefore, the structure for supporting polygon mirror J1 is complicated, and polygon mirror supporting member J2 and holding member J7 are needed, resulting in a large number of parts, cost increase and difficulty in miniaturization.

Due to an employment of the air bearing stated above, it has become possible to rotate a polygon mirror at a rate of tens of thousands rpm, resulting in realization of a high speed digital copying machine and a laser printer.

In the optical deflecting device having a rotating body which rotates at high speed, it has been found that heat is generated in large quantities with rotation, and thereby the temperature of an optical deflecting device and temperature of the apparatus portion around the optical deflecting device are raised, which is not preferable. When a cooling device is provided on an optical deflecting device additionally as measures for the aforesaid problems, the number of parts in the optical deflecting device is increased, resulting in problems that assembly man-hour is increased, cost is increased and an optical deflecting device needs to be large in size.

SUMMARY OF THE INVENTION

Therefore, an object of the invention is to provide an optical deflecting device wherein temperature rise can be impeded despite high speed rotation of a polygon mirror without causing problems of an increase in the number of parts of the optical deflecting device and of a large-sized device, and to provide an image forming apparatus.

The object stated above can be attained by the organization wherein radiating fins are solidly formed on a supporting member on which a coil representing a heat generating source is fixed. The object can further be attained by the organization wherein an optical deflecting device is fixed in an image forming apparatus so that an air current in the image forming apparatus may be almost in parallel with the direction of the radiating fins formed solidly on the supporting member.

DETAILED DESCRIPTION OF THE PREFERRED EMBODIMENT

Embodiments of a scanning optical device and an image forming apparatus of the invention will be explained as follows with reference to the drawings attached herewith.

Figure 1:
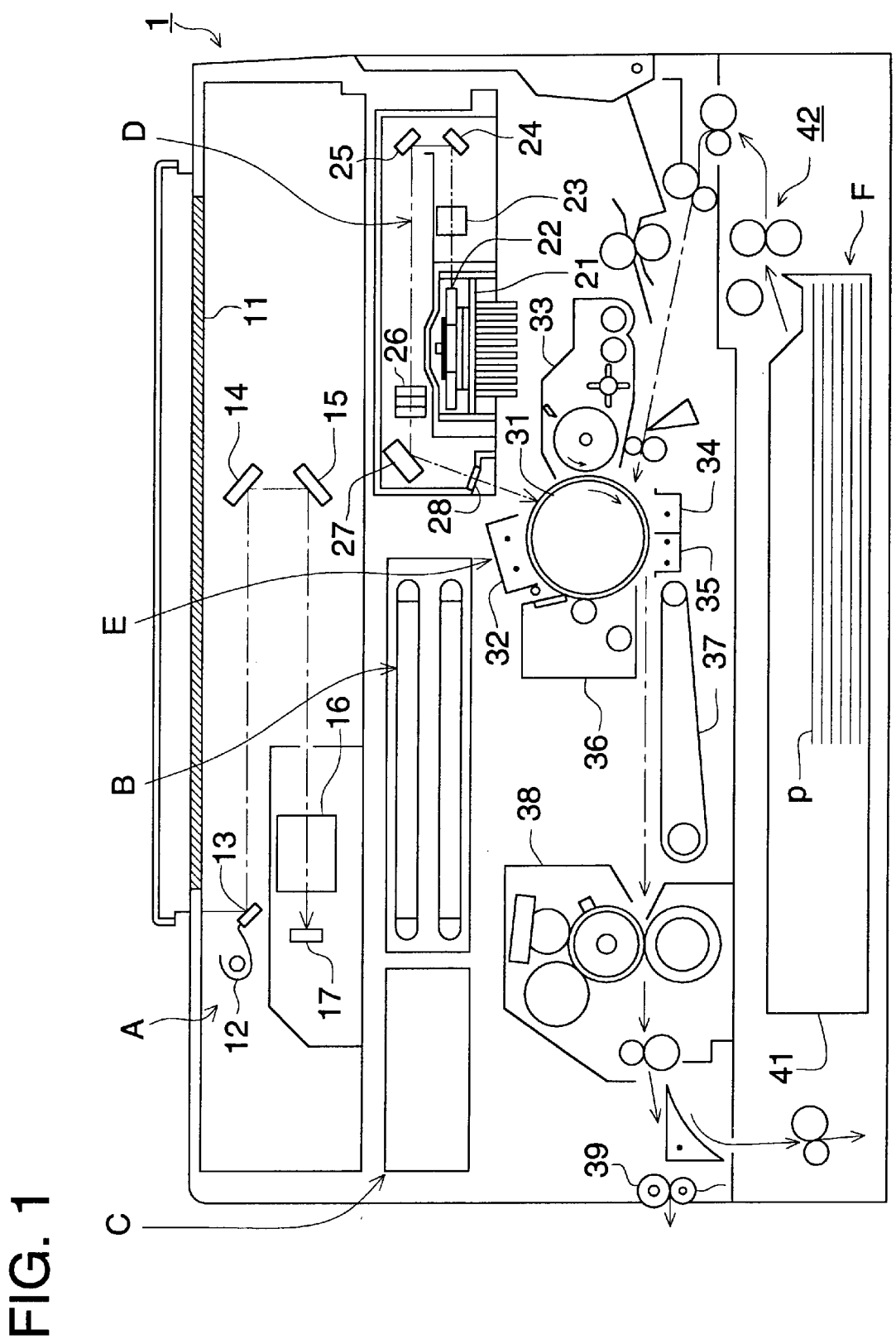
FIG. 1 is a general structure diagram of a digital image forming apparatus related to the invention.

FIG. 1 is a diagram showing general structure of a digital image forming apparatus related to the invention.

Image forming apparatus main body 1 is composed of image reading section A, image processing section B, image storing section C, image writing section D, image forming section E and sheet-feeding section F.

In the image reading section A, document "d" placed on document stand glass (platen glass) 11 is illuminated by halogen lamp 12 provided on a carriage which moves on a slide rail. Light reflected on document "d" is reflected on first mirror 13, second mirror 14 and third mirror 15, then passes through image-forming lens 16 and thereby linear optical images are converted photoelectrically into electric signals in succession by CCD image sensor 17.

Analog signals converted photoelectrically by the CCD image sensor 17 are subjected to analog processing in an image processing section, then are subjected to A/D conversion, shading correction, luminance/density conversion, EE processing, character/halftone-dot discrimination, filter/variable-power processing, copy γ correction, writing density correction, 2-beam control, error diffusion processing and data compression processing, and are outputted to image writing section D through image storing section C.

In the image writing section D, image data after image processing are outputted by a semiconductor laser. This output from the semiconductor laser is subjected to rotary scanning conducted by rotary polygon mirror 22 which is rotated by driving motor 21, then it passes through fθ lens 23, first mirror 24, second mirror 25, cylindrical lens 26 and third mirror 27, and emerges out of cover glass 28 to be projected on photoreceptor drum 31.

The image forming section E is composed of charger 32, developing unit 33, transfer unit 34, separating unit 35 and cleaning unit 36 all arranged around photoreceptor drum 31. There are further arranged conveyance section 37, fixing section 38 and sheet ejecting section 39 at the downstream side of the separating unit 35.

Sheet-feeding section F is composed of sheet-feeding cassette 41 in which transfer sheets "p" are loaded and of sheet-feeding means 42 which separates transfer sheet "p" in the sheet-feeding cassette 41 and feeds it.

Figure 2:
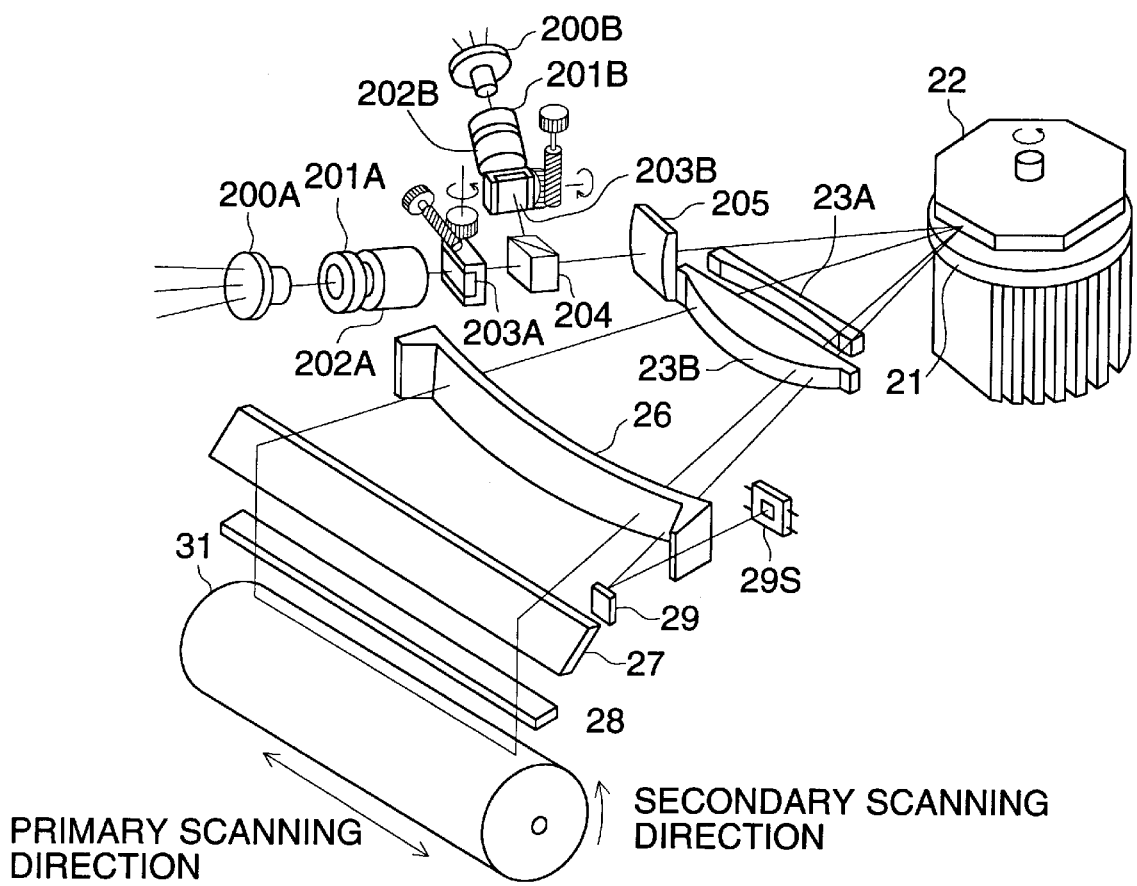
FIG. 2 is a perspective view showing an embodiment of a plural beam scanning optical device.
Figure 3:
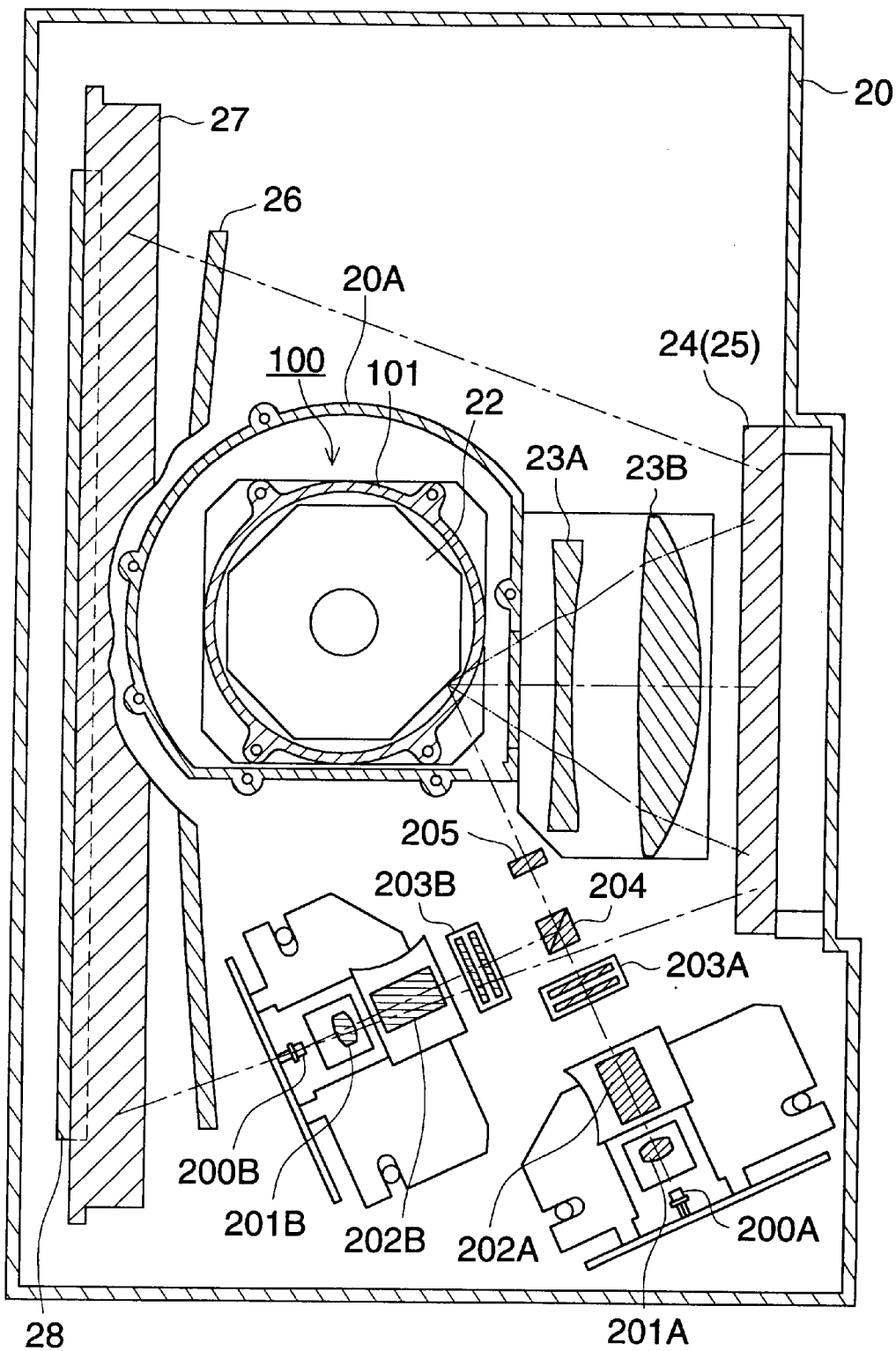
FIG. 3 is a top view of a plural beam scanning optical device.

FIG. 2 is a perspective view showing an embodiment of a plural-beam scanning optical device, and FIG. 3 is a top view of the plural-beam scanning optical device.

In these drawings, a semiconductor laser is represented by 200A and 200B, a collimator lens is represented by 201A and 201B, a compression prism for height adjustment is represented by 202A and 202B, a pair of prism set for fine adjustment in the primary scanning direction is represented by 203A, a pair of prism set for fine adjustment of pitch in the secondary scanning direction is represented by 203B, a beam-composing prism for composing 2 beams is represented by 204, first cylindrical lens is represented by 205, a polygon mirror is represented by 22, an fθ lens is represented by 23A and 23B, second cylindrical lens is represented by 26, third mirror is represented by 27, a cover glass is represented by 28, and a photoreceptor drum is represented by 31. Incidentally, the numeral 29 represents an index mirror for timing detection, 29S represents an index sensor for synchronization detection, and 21 represents a driving motor for the polygon mirror 22.

A beam emerged from semiconductor laser 200A is collimated by collimator lens 201A to be collimated light, and then enters beam-composing prism 204. A beam emerged from semiconductor laser 200B arranged to be perpendicular to the semiconductor laser 200A is also collimated by collimator lens 201B to be collimated light, and then enters beam-composing prism 204. Incidentally, the beam emerged from the semiconductor laser 200B is arranged to be staggered by prescribed pitches from the beam emerged from the semiconductor laser 200A in the secondary scanning direction. Both beams mentioned above enter rotary polygon mirror through first cylindrical lens 205 of the first image-forming optical system. This reflected light is transmitted through a second image-forming optical system composed of fθ lenses 23A and 23B and second cylindrical lens 26, and scans on the circumferential surface of photoreceptor drum 31 through third mirror 27 and cover glass 28 on a 2-line simultaneous basis under the condition of stagger by prescribed pitches in the secondary scanning direction. With regard to the primary scanning direction, rough adjustment has already been made by an unillustrated adjusting mechanism. For synchronization detection for each line, a light flux before the start of scanning is caused to enter index sensor 29S through index mirror 29.

Synchronization for each plane and stagger of the primary scanning between two beams are subjected to fine adjustment.

Figure 4:
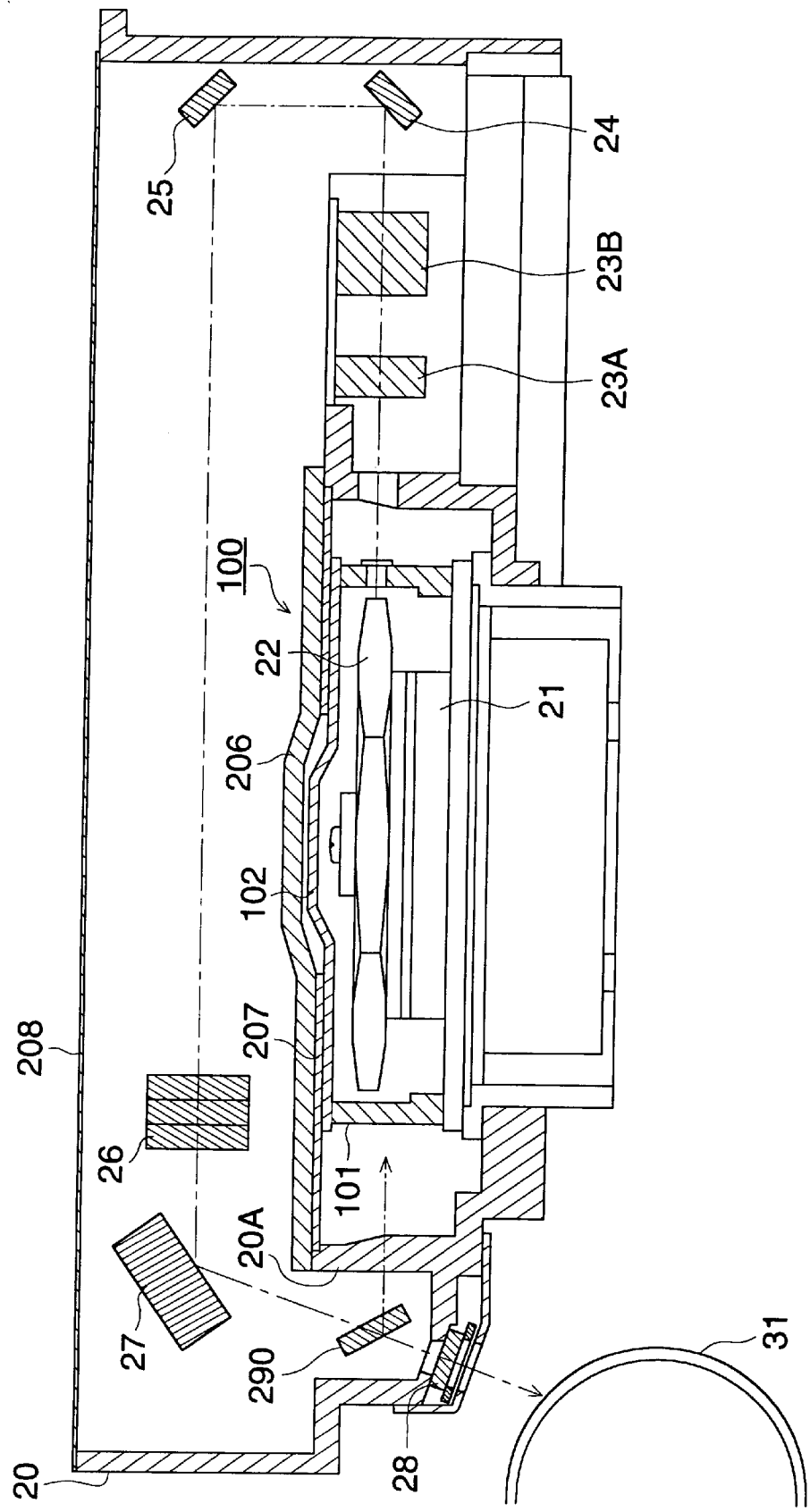
FIG. 4 is a sectional view of the aforesaid scanning optical device.
Figure 5:
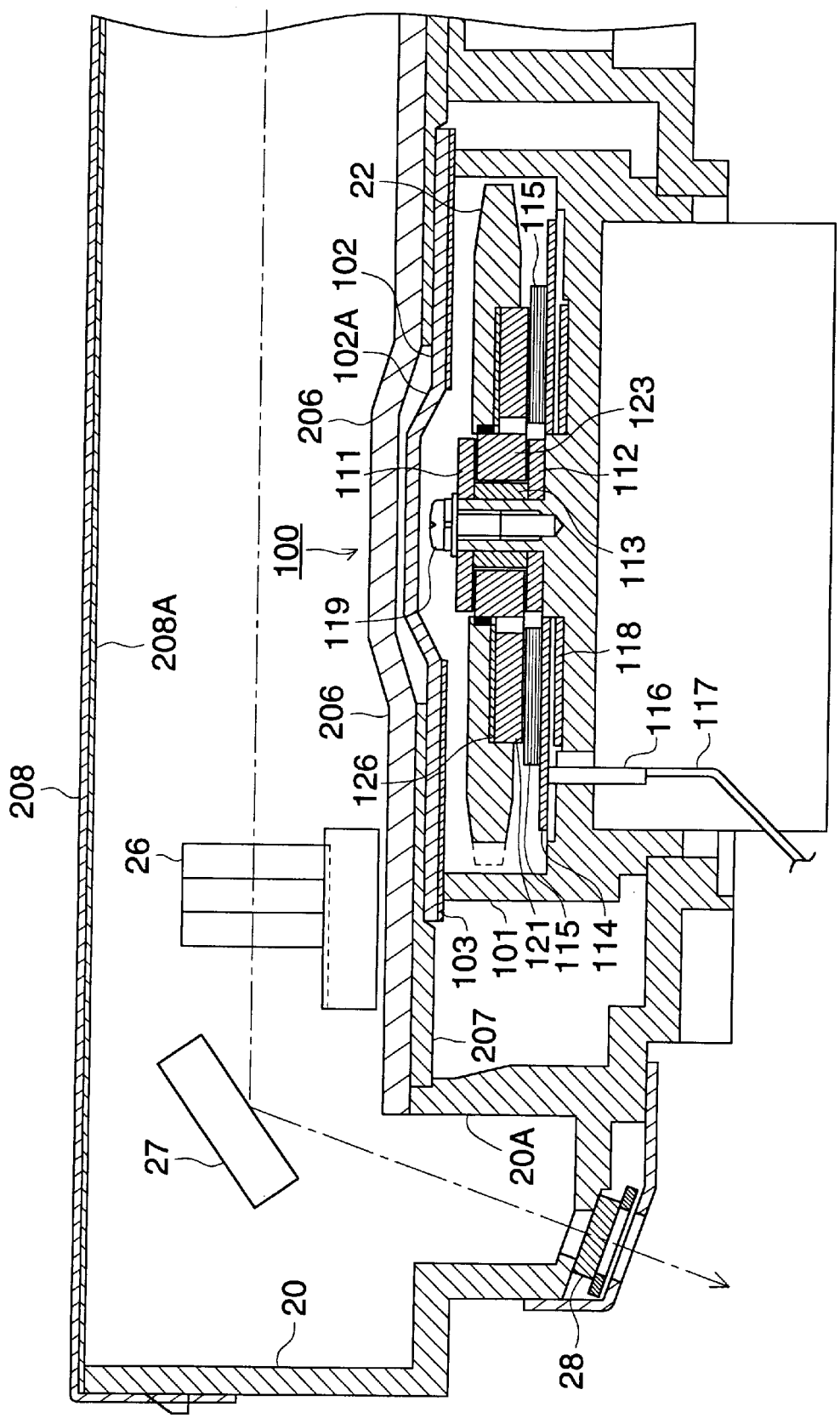
FIG. 5 is an enlarged sectional view of the vicinity of an optical deflecting unit of a scanning optical device.
Figure 11:
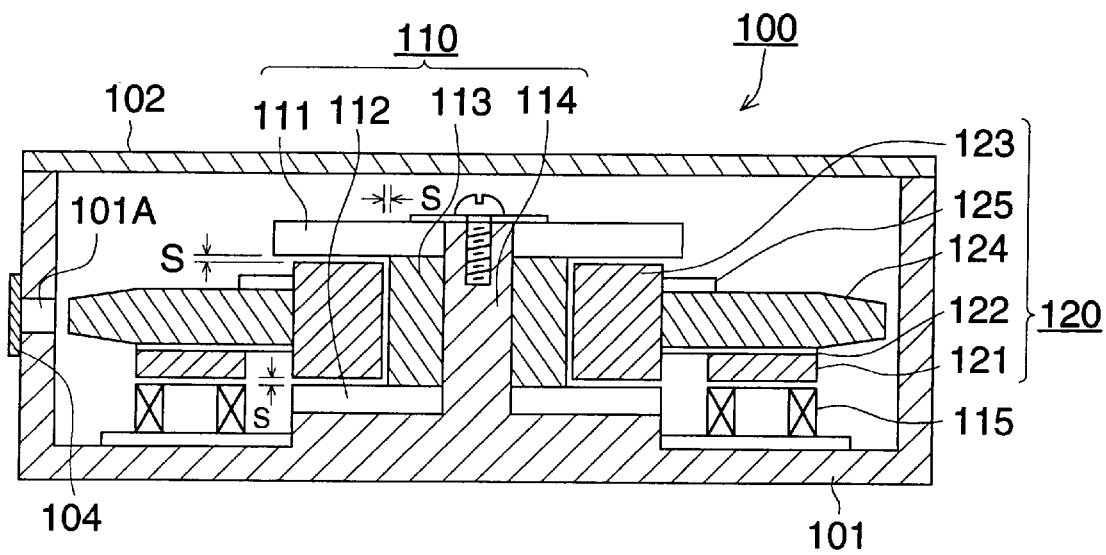
FIG. 11 is a sectional structure diagram of an optical deflecting device having a dynamic pressure bearing in the prior art.
Figure 12:
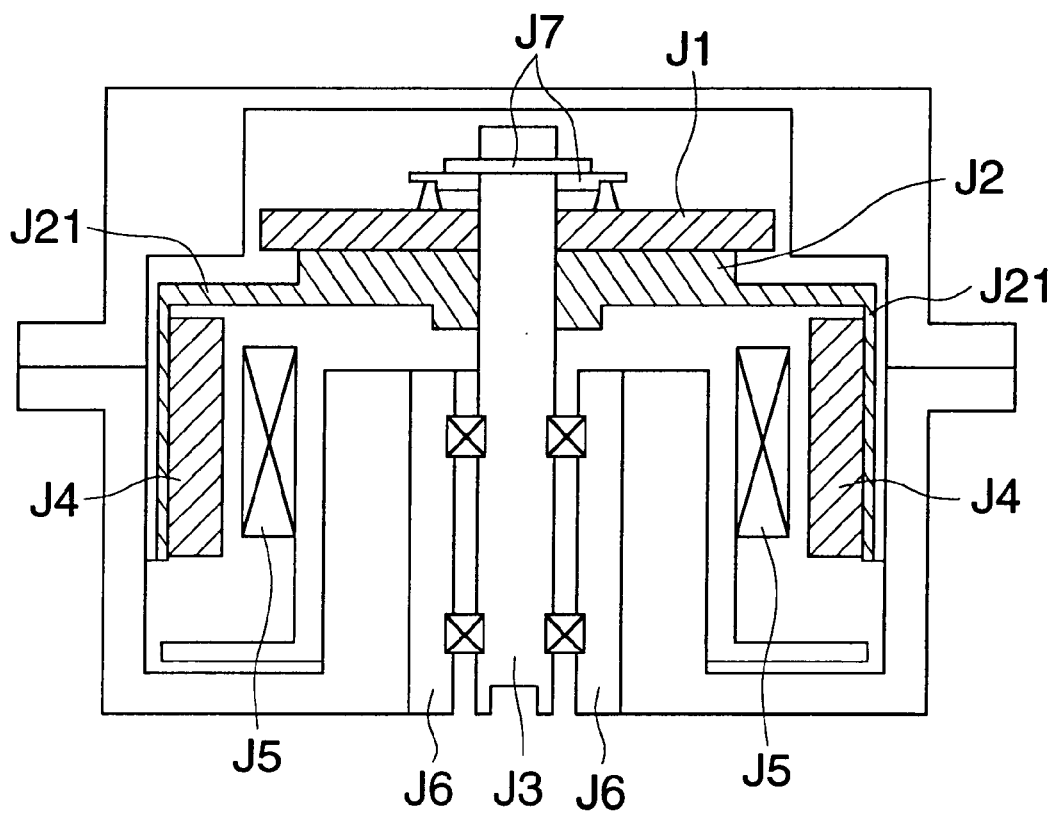
FIG. 12 is a diagram showing an optical deflecting device in the prior art.

FIG. 4 is a sectional view of a scanning optical device related to the invention, and FIG. 5 is an enlarged sectional view of the vicinity of an optical deflecting unit 100 of the scanning optical device. With regard to symbols used in this drawing, parts or components having the same functions as those in FIG. 11 are given the same symbols.

Driving motor 21 which drives rotary polygon mirror 22 to rotate is composed of coil (stator) 115 on the part of casing 101 and magnet (rotor) 121 on the part of the rotary polygon mirror 22. Plural coils 115 are fixed on insulating base board 114. The plural coils 115 are wired in series and are connected to an unillustrated power supply unit through connector 116 and lead wire 117. On the surface of casing 101 under the insulating base board 114, there is fixed stator yoke 118 which is made of silicon steel plate.

The top surface of the plural coils 115 is close to the bottom surface of ring-shaped magnet 121, keeping a prescribed clearance. The top surface of the magnet 121 is directly fixed and glued on the rotary polygon mirror 22 through magnet yoke 126 made of silicon steel plate. A part of the inner circumferential surface of the rotary polygon mirror 22 is brought into contact with an outer circumferential surface of radial shaft outer tube 123 to be positioned, and is fixed with adhesives poured in a recessed portion. Due to this, it is possible to achieve miniaturization of an optical deflecting device without increasing the number of parts. The magnet 121, magnet yoke 126 and rotary polygon mirror 22 are united with radial shaft outer tube 123 to be structured rotatable around dynamic pressure bearing 110.

There is provided a recess on the rotary polygon mirror 22, in which magnet 121 and magnet yoke 126 are buried to be fixed with adhesives, whereby a rotary member including the rotary polygon mirror 22 is made to be thin like a flat plate. This has made improvement in rotating accuracy of the rotary polygon mirror 22 and miniaturization of an optical deflecting device to be possible. An octagonal circumferential surface, namely, a circumferential surface forming a polygon of the rotary polygon mirror 22 is subjected to mirror finish as a reflecting surface.

An upper end face of casing 101 of optical deflecting unit 100 is pressed with cover (inner cover) 102 and elastic sealing member 103 so that an upper open space of casing 101 is sealed. The elastic sealing member 103 is formed with foam resin or rubber sheet, and is pasted on the inner side of cover 102 to be effective for prevention of noise.

Upper thrust plate 111 of dynamic pressure bearing 110 is protruded from the top surface of rotary polygon mirror 22, and screw 119 which fixes the upper thrust plate 111, lower thrust plate 112 and radial shaft inner tube 113 is further protruded from the top surface of the upper thrust plate 111. The cover 102 is made of aluminum alloy sheet, and its central portion is formed to be convex through the drawing. Convex portion 102A processed through the drawing is formed to be a narrow space having a height and a sloped conical surface so that the space may cover the upper thrust plate 111 and screw 119 both protruded from the top surface of the rotary polygon mirror 22 with an in between clearance which is mostly constant for the entire space. By forming the narrow space to keep the clearance between the cover 102 and a group of the upper thrust plate 111 and the rotary polygon mirror 22 to be almost constant as explained above, it is possible to make a volume of air in the casing 101 of the optical deflecting unit 100 to be appropriate, and thereby to reduce occurrence of windage loss, generation of heat and air-cutting noise.

In the optical device main body (casing of an image writing section) 20 which houses optical members of the scanning optical device, the upper end surface of a wall surface of wall body 20A on which the optical deflecting unit 100 is fixed is in pressure contact with top cover 206 which seals the upper space of the wall body 20A and with elastic sealing member 207, and the upper open space of the wall body 20A is sealed. The top cover 2–6 is made of resins having vibration damping characteristics such as ABS resin.

The elastic sealing member 207 is made of damping material composed of expandable resins such as foaming urethane rubber or foaming ethylene propylene rubber (EPDM), and is stuck on an inner surface of the top cover 206 to be effective for prevention of a noise.

A central portion and its vicinities of the top cover 206 are formed to be protruded in a convex form, and a narrow space is formed between an inner surface of the top cover (outer cover) 206 and an outer surface of the cover (inner cover) 102 to keep the distance between the inner surface and the outer surface to be mostly constant.

The elastic sealing member 207 stuck on the inner surface of the top cover 206 is brought into pressure contact with the outer surface of the cover 102 for sealing. The elastic sealing member 207 interposed and filled in a clearance between the cover 102 and the top cover 206 prevents air-cutting noise caused by the rotary polygon mirror 22 from leaking out, and is effective for vibration damping.

The numeral 208 is a cover which covers the upper space of the optical device main body 20, and has on its inner surface elastic sealing member 208A which is effective for dust-proofing and sound-proofing.

Figure 6:
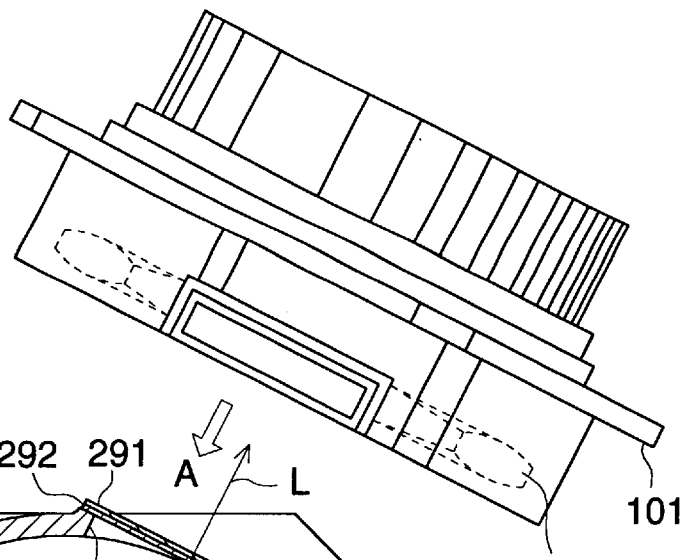
FIG. 6(a) is a top view of an optical deflecting unit with its cover removed.
FIG. 6(b) is a side view of the optical deflecting unit viewed in the direction shown with arrow mark A.
FIG. 6(c) is an enlarged sectional view showing the layer structure of a double-sided adhesive tape.
Figure 6:
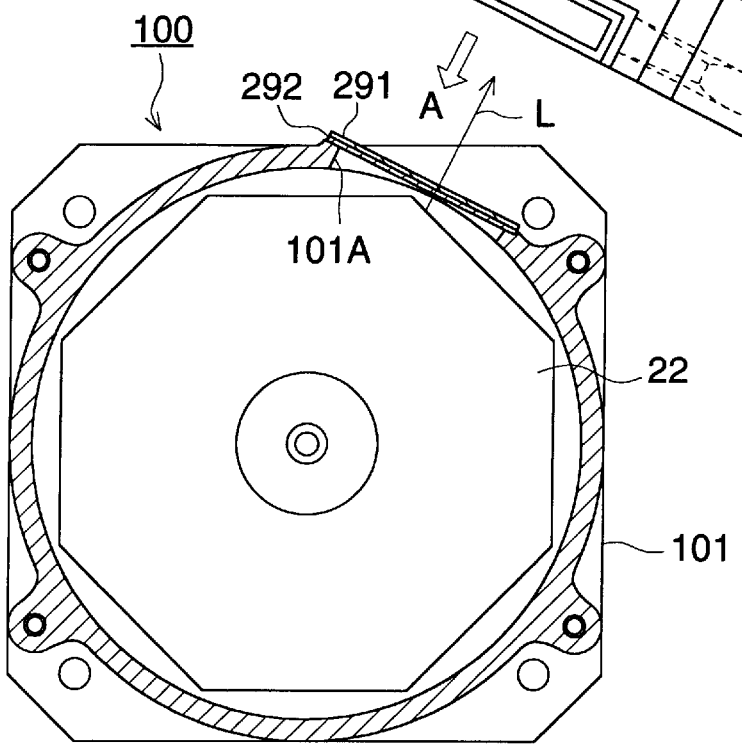
Figure 6:
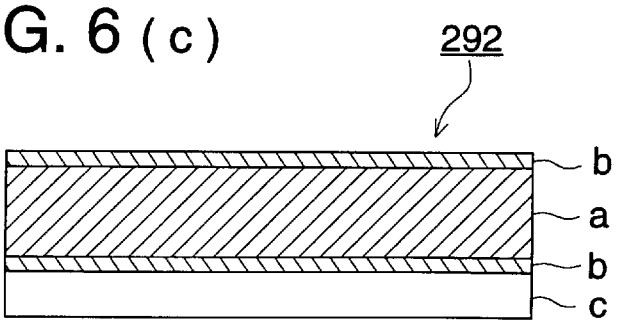
Figure 7:
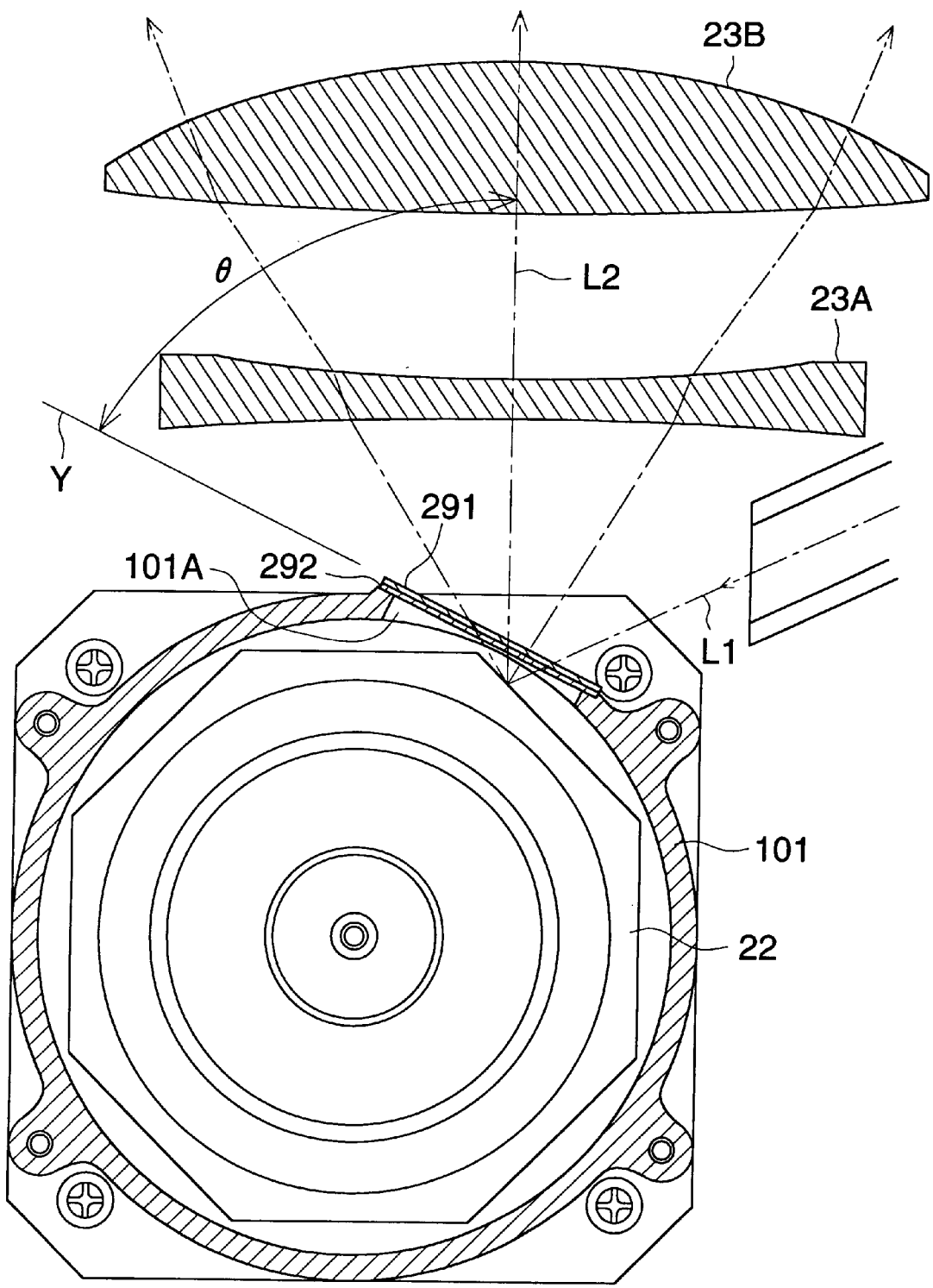
FIG. 7 is an enlarged top view of the optical deflecting unit and an optical system.

FIG. 6(a) is a top view of optical deflecting unit 100 from which cover 102 is removed, FIG. 6(b) is a side view viewed from arrow A in the optical deflecting unit 100, and FIG. 7 is an enlarged top view of the optical deflecting unit 100 and an optical system.

A part of a side wall of casing 101 is cut off so that opening 101A is provided. This opening 101A is an outlet through which beam L is emerged out when rotary polygon mirror 22 is rotated. On the outer side of the opening 101A, transparent light-transmitting member (glass of an aperture for light to enter and emerge) 291 is glued through double-sided adhesive tape 292.

A member which is excellent in adhesive force, sealing characteristics, durability and damping properties is used as the double-sided adhesive tape 292. For example, structural VHB adhesive tape Y-4905J or Y-4920 (both are made by SUMITOMO 3M CO.) was used, and it proved to be favorable.

FIG. 6(c) is an enlarged sectional view showing the layer structure of double-sided adhesive tape 292. Any of adhesive tape Y-4905J or Y-4920 is one wherein acrylic adhesives "b" are laminated on both sides of acrylic foam base material "a" having elasticity, and before it is used, release film "c" is stuck on one side of the acrylic adhesive "a" to protect it. By using this double-sided adhesive tape 292, there have been attained improvement in adhesiveness and in easy sticking operations, while conventional adhesives (adhesives of a silicone rubber type or of an epoxy resin type) require much time to be hardened.

Figure 8A:
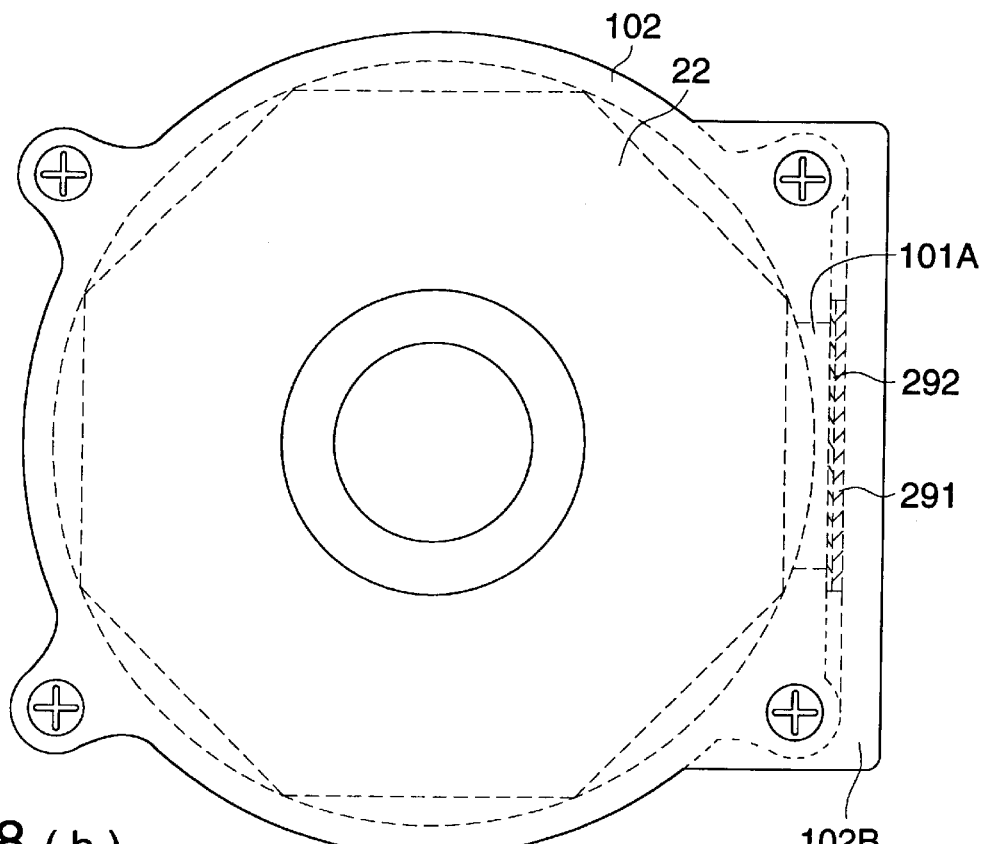
FIGS. 8(a) and 8(b) are respectively a top view and a sectional view of an optical deflecting unit.
Figure 8B:
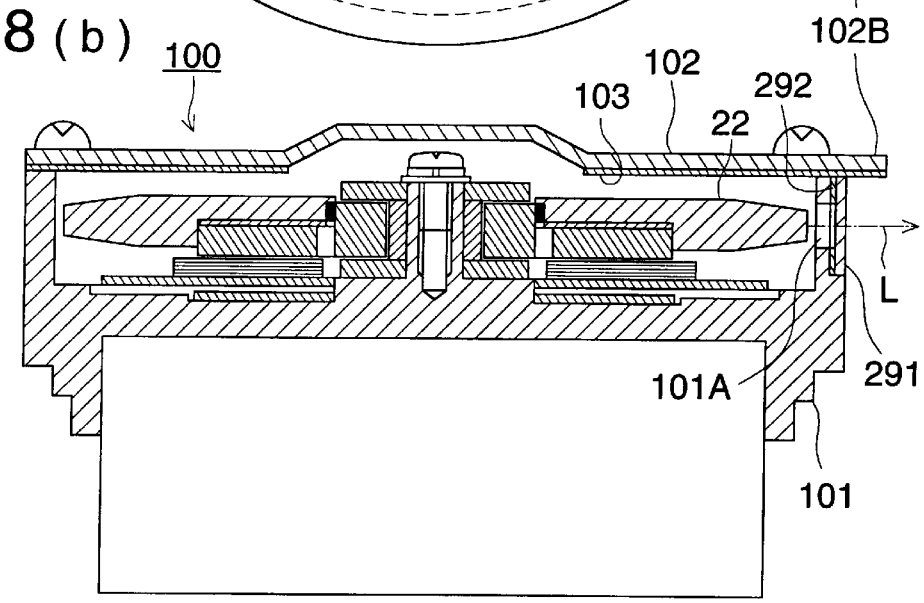

FIG. 8(*a*) is a top view of optical deflecting unit 100 related to the invention, and FIG. 8(*b*) is a sectional view of the optical deflecting unit 100.

A part of cover 102 which covers the upper open space of casing 101 of optical deflecting unit 100 is protruded from a side wall surface in the vicinity of the opening 101A of the casing 101 to form pent roof 102B. This pent roof 102B is a protecting section which widely covers the upper portion of light-transmitting member 291, and it prevents that tools for working such as screwdrivers touch the light-transmitting member 291 to damage it in the course of operations of the optical deflecting unit 100, or a fingertip touches the light-transmitting member 291 to leave thereon stains such as fingerprints.

Figure 9:
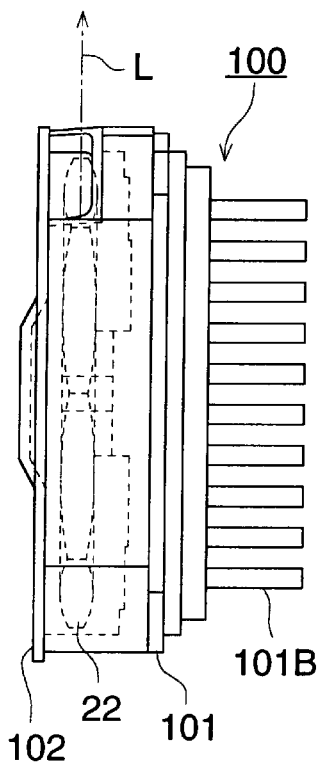
FIGS. 9(a), 9(b) and 9(c) are respectively a side view, a rear view and a sectional view of an optical deflecting unit.
Figure 9:
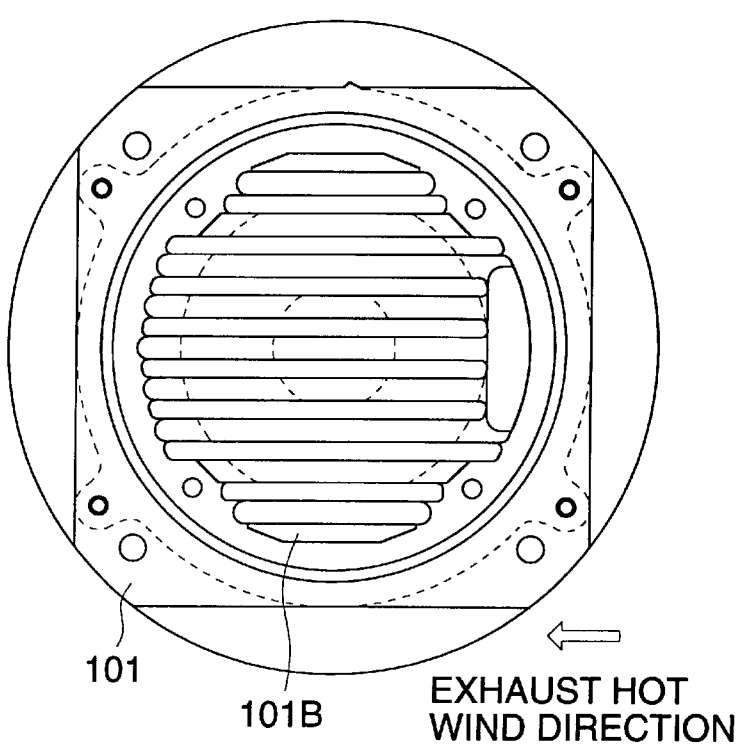
Figure 9:
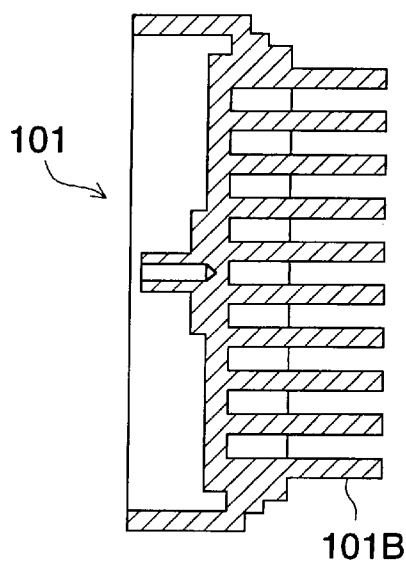
Figure 10:
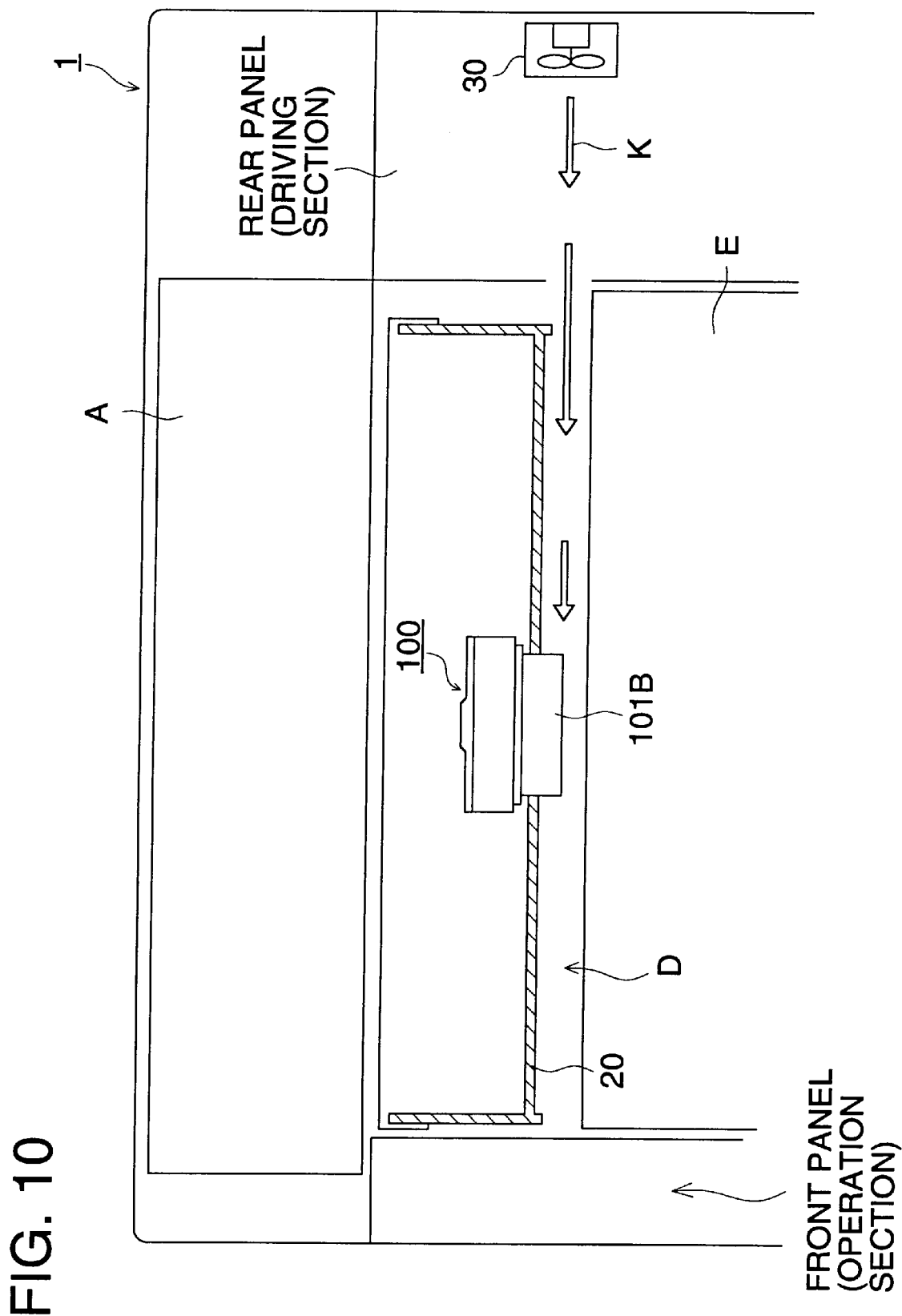
FIG. 10 is a side sectional structure diagram of an image forming apparatus main body.

FIG. 9(*a*) is a side view of optical deflecting unit 100 related to the invention, FIG. 9(*b*) is a rear view of the optical deflecting unit 100, FIG. 9(*c*) is a side view of casing 101, and FIG. 10 is a side sectional structure diagram of image forming apparatus main body 1.

Under the casing 101 of optical deflecting unit 100, there are provided plural radiating fins 101B which are arranged solidly in parallel. Due to this, heat generated by rotation of rotor 120 at high speed is irradiated. The outer surface of the casing 101 including radiating fins 101B made of aluminum is treated with black anodized aluminum plating, by which the radiating effect is further enhanced. Further, the top surface of cover 102 made of aluminum which covers the upper open space of casing 101 is also treated with black anodized aluminum plating, and radiating effect is further enhanced.

Comparisons were made in terms of temperature rise in the course of rotation at high speed for the optical deflecting unit of the invention, an optical deflecting unit having no cooling means of a radiating fin and an optical deflecting unit provided with a separate radiating fin. As a result, it was proved that the optical deflecting unit of the invention which had temperature rise of only 20° C. at 16500 rpm and that of 30° C. at 25000 rpm can be used sufficiently even at high speed rotation. On the contrary, the optical deflecting unit having no radiating fin had temperature rise of 40° C. at 16500 rpm. The optical deflecting unit provided with a separate radiating fin had temperature rise of 35° C. at 16500 rpm. Therefore, it was clearly proved that the optical deflecting unit of the invention has high radiating effect.

As shown in FIG. 10, in the image forming apparatus main body 1 which is equipped with the optical deflecting unit of the invention, there is provided air-blowing means 30 for lowering temperature in the apparatus. The optical deflecting unit is mounted in the image forming apparatus main body 1 so that the direction of radiating fin 101B and the air-blowing direction of the air-blowing means 30 are mostly in parallel. Air blown in the image forming apparatus main body 1 from the air-blowing means 30 hits and passes through the radiating fin 101B, and then is ejected out of the image forming apparatus 1 from an air ejecting hole (not shown) provided on the side facing the image forming apparatus 1 or from each clearance on the image forming apparatus 1. Owing to this, it is possible to eject the heat irradiated from fins 101B out of an image forming apparatus 1 effectively, and thereby to further enhance an effect of radiation conducted by the radiating fins 101B. As a means to form an air flow in image forming apparatus 1, the invention is not naturally limited to an air-blowing means, any means such as an air exhausting means or the like can be used, provided that an air flow of whichever type can be formed.

As stated in detail above, the optical deflecting device of the invention makes it possible to eject the heat generated when a rotor having reflecting surfaces on its circumferential surface is rotated at high speed out of the optical deflecting device effectively, since radiating fins are formed solidly on a supporting member for the optical deflecting device. Therefore, it is possible to prevent temperature rise in the optical deflecting device without having an increase of the number of parts, cost increase and a large-sized optical deflecting device or an image forming apparatus. Namely, it is possible to prevent deterioration of surface accuracy of a rotary polygon mirror caused by thermal deformation and to prevent occurrence of rotation fluctuation of rotor 120.

Further, an image forming apparatus of the invention further makes it possible to prevent temperature rise of an optical deflecting device and temperature rise in a peripheral image forming apparatus equipped with the optical deflecting device, because the optical deflecting device is provided so that the direction of radiating fins formed solidly with a supporting member for the optical deflecting device may be in parallel mostly with the air flow direction in the image forming apparatus. It is therefore possible to continue outputting images which are free from scanning unevenness and image distortion and have excellent image quality for a long time, without causing an increase in the number of parts, cost increase and large-sized optical deflecting device and image forming apparatus.

What is claimed is:

1. An optical deflection device comprising:
    (a) a rotor having a polygonal mirror whose circumferential surfaces comprise reflection surfaces, a radius of said rotor being greater than a height of said rotor;
    (b) a bearing for rotatably supporting said rotor;
    (c) a magnet fixed on said rotor;
    (d) a supporting member for said bearing, on which a radiating fin is integrally formed, wherein said supporting member is a housing for accommodating said rotor;
    (e) a coil on said supporting member where said coil faces said magnet to form a magnetic field; and
    (f) a cover for covering an upper opening of said supporting member as the housing, said cover is made of aluminum, whose surface is made of anodized aluminum.

2. The deflection device of claim 1, wherein said supporting member is made of aluminum.

3. The deflection device of claim 1 wherein said rotor rotates while maintaining a gap between said rotor and said bearing.

4. The deflection device of claim 1, wherein a distance between an inner surface of said cover and an upper surface of said rotor is substantially equal to a distance between said inner surface of said cover and an upper surface of said bearing.

5. The defection device of claim 1, wherein a distance between an under side of said cover and the entire rotating upper surface of said rotor is substantially constant.

6. An image forming apparatus equipped with an optical device comprising:
    (a) a rotor having a polygonal mirror whose circumferential surfaces comprise reflection surfaces, a radius of said rotor being greater than a height of said rotor;
    (b) a bearing for rotatably supporting said rotor;
    (c) a magnet fixed on said rotor;
    (d) a supporting member for supporting said bearing means, on which a radiating fin is integrally formed, wherein said supporting member is made of aluminum, whose surface is made of anodized aluminum; and (e) a coil on said supporting member where said coil faces said magnet to form a magnetic field, wherein said optical deflection device is fixed so that a direction of said radiating fin is substantially in parallel to an air flow inside said apparatus.

7. The image forming apparatus of claim 6, wherein said rotor rotates while maintaining a gap to said bearing means.

8. The image forming apparatus of claim 6, wherein said supporting member is a housing for accommodating said rotor.

9. The image forming apparatus of claim 6 further comprising a cover for covering an upper opening of said supporting member as the housing, said cover is made of aluminum.

10. The image forming apparatus of claim 6 further comprising a ventilator for causing said air flow inside said apparatus.

11. The image forming apparatus of claim 6 further comprising a cover for covering an upper opening of said supporting member, wherein a distance between an inner surface of said cover and an upper surface of said rotor is substantially equal to a distance between said inner surface of said cover and an upper surface of said bearing.

12. The deflection device of claim 6 further comprising a cover for covering an upper opening of said supporting member, wherein a distance between an under side of said cover and the entire rotating upper surface of said rotator is substantially constant.

* * * * *